United States Patent [19]
Suzuki et al.
[11] Patent Number: 4,794,451
[45] Date of Patent: Dec. 27, 1988

[54] SIGNAL GENERATOR GENERATING CHARACTER DATA HAVING CONTOUR

[75] Inventors: Hiroyuki Suzuki; Kazuhide Kawata, both of Tokyo, Japan
[73] Assignee: NEC Corporation, Tokyo, Japan

[21] Appl. No.: 57,146
[22] Filed: Jun. 3, 1987
[30] Foreign Application Priority Data
Jun. 3, 1986 [JP] Japan ................................ 61-129582
[51] Int. Cl.[4] ................................................ H04N 7/00
[52] U.S. Cl. ........................................ 358/96; 340/730
[58] Field of Search ................. 358/96, 284, 287, 280; 340/730; 382/19, 22, 56

[56] References Cited

U.S. PATENT DOCUMENTS 3,984,828 10/1976 Beyers ................................ 340/730
4,020,462 4/1977 Morrin, II ............................ 382/56
4,437,092 3/1984 Dean et al. .................... 340/730 X
4,466,123 8/1984 Arai et al. ......................... 358/96 X

*Primary Examiner*—Howard W. Britton
*Assistant Examiner*—Victor R. Kostak
*Attorney, Agent, or Firm*—Sughrue, Mion, Zinn, Macpeak, and Seas

[57] ABSTRACT

A character generator for generating a data signal for a character having an emphasizing contour. The generator includes a memory storing data of a character to be displayed. This data comprising first data representing a contour of the character and second data representing a compressed character data. The first data are stored in a first shift register and shifted in synchronism with a first shift clock, and the second data are stored in a second shift register and shifted in synchronism with a second shift clock having a frequency smaller than that of the first shift clock. A contour signal and a character signal are thereby generated.

7 Claims, 7 Drawing Sheets

| | (MSB) 15 | 14 | | | | 10 | 9 | | | | | | | | | (LSB) 0 |
|---|---|---|---|---|---|---|---|---|---|---|---|---|---|---|---|---|
| "1120" | X | 0 | 0 | 0 | 0 | 0 | 0 | 0 | 0 | 1 | 1 | 1 | 1 | 0 | 0 | 0 |
| | X | 0 | 1 | 1 | 1 | 0 | 0 | 0 | 1 | 0 | 0 | 0 | 0 | 1 | 0 | 0 |
| | X | 0 | 1 | 1 | 1 | 0 | 0 | 1 | 0 | 0 | 0 | 0 | 0 | 0 | 1 | 0 |
| | X | 1 | 1 | 0 | 1 | 1 | 1 | 0 | 0 | 0 | 1 | 1 | 0 | 0 | 0 | 1 |
| | X | 1 | 1 | 0 | 1 | 1 | 1 | 0 | 0 | 1 | 0 | 0 | 1 | 0 | 0 | 1 |
| | X | 1 | 1 | 0 | 1 | 1 | 1 | 0 | 0 | 1 | 0 | 0 | 1 | 0 | 0 | 1 |
| | X | 1 | 1 | 0 | 1 | 1 | 1 | 0 | 0 | 1 | 0 | 0 | | 0 | 0 | 1 |
| | X | 0 | 1 | 0 | 1 | 0 | 0 | 1 | 1 | 1 | 0 | 1 | 0 | 0 | 1 | 0 |
| | X | 0 | 0 | 1 | 1 | 0 | 0 | 0 | 0 | 0 | 1 | 0 | 0 | 0 | 1 | 0 |
| | X | 0 | 0 | 1 | 1 | 0 | 0 | 0 | 0 | 1 | 0 | 0 | 0 | 1 | 0 | 0 |
| | X | 0 | 1 | 1 | 1 | 0 | 0 | 0 | 1 | 0 | 0 | 0 | 1 | 0 | 0 | 0 |
| | X | 0 | 1 | 1 | 0 | 0 | 0 | 1 | 0 | 0 | 0 | 1 | 1 | 1 | 1 | 0 |
| | X | 1 | 1 | 1 | 1 | 1 | 1 | 0 | 0 | 0 | 0 | 0 | 0 | 0 | 0 | 1 |
| | X | 1 | 1 | 1 | 1 | 1 | 1 | 0 | 0 | 0 | 0 | 0 | 0 | 0 | 0 | 1 |
| | X | 0 | 0 | 0 | 0 | 0 | 0 | 1 | 1 | 1 | 1 | 1 | 1 | 1 | 1 | 0 |
| "112F" | X | 0 | 0 | 0 | 0 | 0 | 0 | 0 | 0 | 0 | 0 | 0 | 0 | 0 | 0 | 0 |

COMPRESSED CHARACTER DATA (bits 14–10) — CONTOUR DATA (bits 9–0)

SIGNAL GENERATOR GENERATING CHARACTER DATA HAVING CONTOUR

BACKGROUND OF THE INVENTION

The present invention relates to a signal generator for generating data signals which are used for displaying numerals, letters, symbols, etc. (hereinafter collectively called "characters") on a raster scan display (hereinafter called simply "display"), such as a television receiver, by superimposing them on a video picture. More particularly, the invention concerns a character generator for generating a character data signal with a contour data signal to display a character with an emphasizing contour.

Some television receivers have a function of superimposing a selected channel number or other letters on a video picture to display it on a display along with video picture. In such character display, if the character is displayed on such an area of the video picture that has brightness and/or color near the character to be displayed, is drowned by the surrounding video area. In order to solve this problem, the character is emphasized with a contour of a different color. For example, the character is displayed along with black contour, so that the displayed character is clearly visible.

According to prior art, the contour data signal is generated from the character data by use of a great number of various gate circuits.

Also in the television receiver, digital data processing using a microcomputer has been employed widely to perform digital tuning using PLL (Phase Locked Loop) techniques and digital control of brightness, contrast, or sound volume. However, generation of the character with a contour has been performed by use of a special-purpose IC (Integrate Circuit) for character display.

SUMMARY OF THE INVENTION

Therefore, an object of the present invention is to provide a character generator generating a data signal for a character and a contour with a novel and simplified circuit construction.

Another object of the present invention is to provide a character generator for a character and an emphasizing contour, in which a microcomputer provided for performing another digital data processing is used.

A generator according to the present invention includes a memory storing data of a character and contour to be displayed. The data comprises a contour data representative of a contour of the character and a compressed character data representative of an inside portion of the contour. The contour data is read out of the memory and temporarily stored in a first shift register and shifted by a first shift clock. The compressed character data is read out simultaneously with the contour data and temporarily stored in a second shift register and shifted by a second shift clock having a frequency smaller than that of the first shift clock. The output of the first shift register is utilized as a contour signal to be displayed. An expanded character signal to be displayed is outputted from the second shift register and modified by the output of the first shift register.

The contour data are constructed with a first number of bits and the compressed character data are constructed with a second number of bits. The first number is larger than the second number. The memory capacity is thereby reduced.

Thus, both of the contour data and the compressed character data to be displayed are stored in the memory and addressed simultaneously, and therefore the character having an emphasizing contour is superimposed on a video picture without complicated logic circuits.

BRIEF DESCRIPTION OF THE DRAWINGS

The above and other objects, advantages and features will be more apparent from the following description taken in conjunction with the accompanying drawings, in which.

DETAILED DESCRIPTION OF THE EMBODIMENTS

Figure 1:
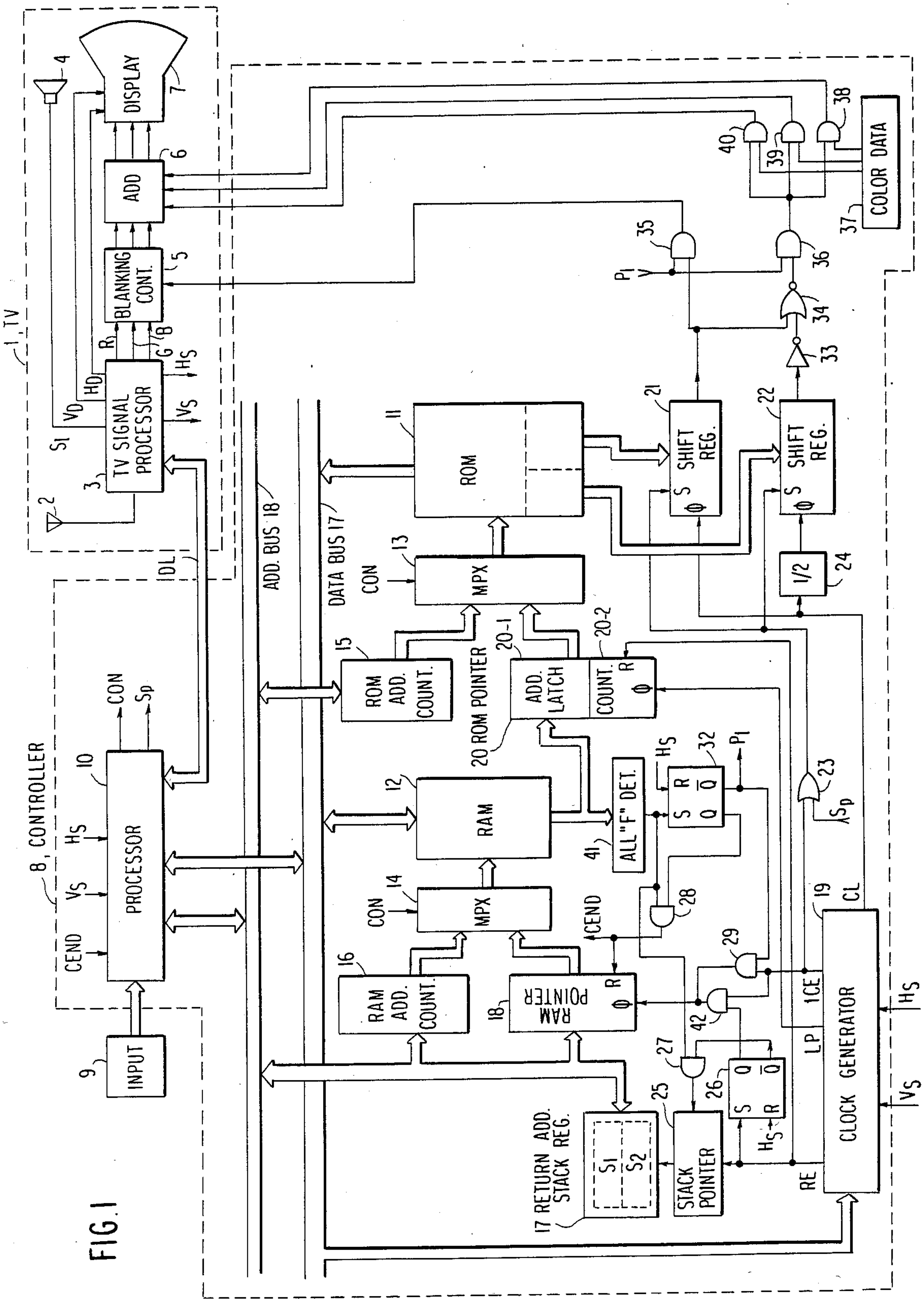
FIG. 1 is a block diagram representing an embodiment of the present invention.

Referring to FIG. 1, a circuit diagram according to an embodiment of the present invention is shown. In a television receiver 1, a television signal processing circuit 3 carries out a tuning function to a broadcasting signal received by an antenna 2 and detects the broadcasting signal. The circuit 3 further separates the detected signal into a sound information signal and a video information signal. The sound information signal is sound-detected, and a sound volume control is carried out to supply a sound signal $S_I$ to a loudspeaker 4. On the other hand, a vertical synchronizing pulse $V_S$ and a horizontal synchronizing pulse $H_S$ are picked out from the video information signal to produce vertical and horizontal deflection signals $V_D$ and $H_D$. These signals $V_D$ and $H_D$ are supplied to a display 7. Moreover, three primary color signal R, G and B having controlled brightness and contrast information are generated, and these signals R, G and B are supplied via a blanking control circuit 5 and an adder circuit 6 to the display 7. As a result, video pictures transmitted from a broadcasting station are reproduced on the display 7.

The above-mentioned tuning operation in the television signal processing circuit 3 is carried out by the frequency synthesizer method using the PLL circuit under the control of a controller (microcomputer) 8 in response to an operated key or keys among channel selection keys provided in an input device 9. The input device 9 may be installed on a front panel of a television receiver set or may be represented as a remote control signal transmitter. Moreover, the control of sound volume, brightness and contrast is performed digitally by the controller 8 in response to the operation of the associated key provided in the input device 9. The data for these controls are transmitted via data lines DL between the controller 8 and the circuit 3. The detailed description for those controls are omitted, because it is well-known by those skilled in the art and further does not directly relate to the present invention.

Figures 2, 3:
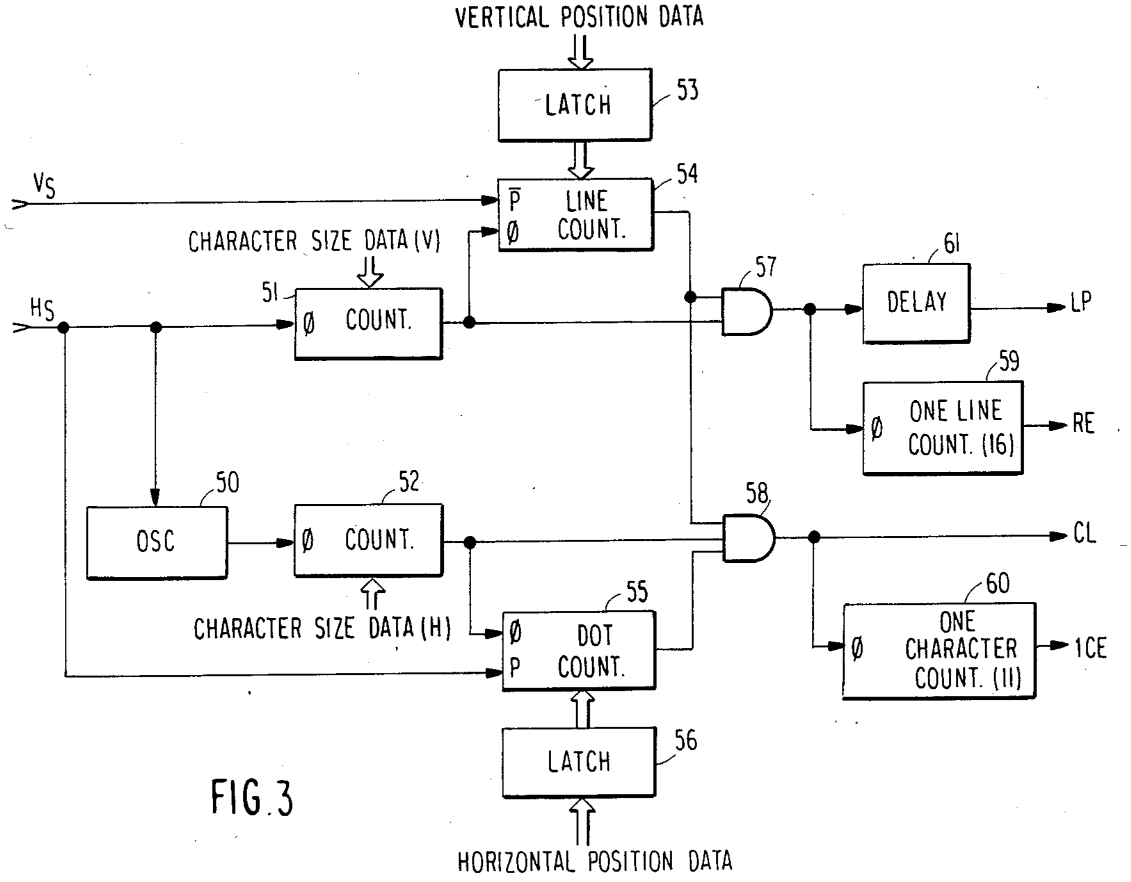
FIG. 2 is a data map representing a part of a read only memory (ROM) 11 shown in FIG. 1.
FIG. 3 is a circuit diagram denoting a clock generator 19 shown in FIG. 1.

In accordance with the present invention, the controller 8 is provided with a character generator for superimposing characters having an emphasizing contour on a video picture to display them on the display 7. The character generator is fabricated on one semiconductor substrate along with a processor 10, a read only memory (ROM) 11 and a random access memory (RAM) 12. The ROM 11 stores programs for instructing data processing of the processor 10. The RAM 12 is used as a data memory for program execution. The ROM 11 further stores character data to be displayed in accordance with the present invention. In order to emphasize the contour of each character, each character data are divided into contour data and character data. In this embodiment, each contour data for each character has a size of ten picture elements on a horizontal line by sixteen picture elements on a vertical line. One picture element is made to correspond to one bit of the ROM 11. If the character data has a size of 10×16 bits like the contour data, the combined data of contour data and character data for each character has a size of 20×16 bits. Since each address of the ROM 11 is constructed with 16 bits, the data per one scan line for one character cannot be memorized in one address of the ROM 11. Two addresses are required. A great increase of memory capacity is thereby required. In this embodiment, therefore, the character data is compressed such that each character data consists of 5×10 bits. In other words, the data per one scan line of the character is compressed to ½, and the overall data for each character has a size of 15×16 bits. Thus, the data on one scan line can be stored in one address. For example, the character data for the numbers "2" are stored in an area from "1120" (hexadecimal) address to "112F" address of the ROM 11 as shown in FIG. 2 and the contour data are stored from 0th bit (LBS) to 9th bit and the character data from 10th bit to 14th bit. In the contour data part, the memory locations corresponding to the contour store bits "1", and the remaining locations store "0". In the character data part, the memory locations corresponding to horizonally-compressed character store "1", and the remaining locations store "0". Since the MSB is not used, its data may take "1" or "0" and is represented by mark "X" in the drawing. Memory locations for other characters "0", "1", "3" to "9" are also divided into the contour data part and the compressed character data part and their addresses are from "1100" to "110F", "1110" to "111F", "1130" to "113F", . . . , and "1190" to "119F" of the ROM 11, respectively.

Turning back to FIG. 1, when the controller 8 does not operate the character display, the processor 10 does not generate a character-on signal CON (this signal taking the low level). Multiplexers 13 and 14 select a ROM address counter 15 and a RAM address counter 16, respectively. Therefore, the processor 10 executes the instruction from the ROM 11 accessed by the ROM address counter 15. At this time, the RAM 12 is used as a data memory.

When at least one of channel selection keys provided in the input device 9 is operated to receive a broadcasting wave signal at other than a non-receiving station, the controller 8 supplies data for switching a receiving-channel to the TV signal processing circuit 3. The controller 8 further generates data signals for displaying a number of the receiving-channel on the display 7. The circuit operation thereof will be described below for the case where the number of the receiving-channel is "2".

At first, the processor 10 writes the current starting address "1120" of the area of the ROM 11 wherein the character data "2" are stored into the address of the RAM 12 accessed by the RAM address counter 16. The count value of the counter 16 is incremented by one after a data-write operation, so that a next address of the RAM 12 is written. This continues until the writing of data "FFFF" (hexadecimal), which represents the end of one row character display. Since the character display within one picture is completed at one row, the data of "FFFF" is written into a further next address of the RAM 12. Thus, the fact that the data "FFFF" is written twice without a break means the end of the character display within one picture. A first stack register $S_1$ of a return address stack register 17 is thereafter written with data that represents the address of the RAM 12 in which the data "1120" is stored. The data written into the first stack register $S_1$ is "F000", for example, and is also stored in a RAM pointer 18. Since only one character display is carried out within one picture, a second stack register $S_2$ is not stored with any data. In addition, the processor 10 supplies via a data bus 117 to a clock generator 19 data for representing a display location of the character on the display 7. A high level character-on signal CON is thereafter generated by the processor 10. The multiplexer 14 selects the RAM pointer 18. The data stored in the RAM pointer 18 is supplied to the RAM 12. The upper twelve bits of the data stored in the accessed address of the RAM, i.e. "112" (hexadecimal), are supplied to a ROM pointer 20 which comprises an address latch part 20-1 and a counter part 20-2. The upper 12 bits data from the RAM 12 are latched in the address latch part 20-1. In an initial state, the value of the counter part 20-2 is 0. Since the multiplexer 13 selects the ROM pointer 20, the "1120" address of the ROM 11 is accessed and the data stored in the access address, i.e. "X000000001111000", are read out. The processor 10 carries out the above-mentioned operations during a high level period of the vertical synchronizing pulse Vs.

Within the data read out from the ROM 11, the data from 0th bit to 9th bit, i.e. the counter data, are supplied to a shift register 21, and the data from the 10th bit to 14th bit, i.e. compressed character data, are supplied to a shift register 22. The processor 10 generates a set pulse Sp in synchronism with the change from the high level to the low level of the horizontal synchronizing pulse Hs. This pulse Sp is supplied via an OR gate 23 to set terminals $\phi$ of the shift registers 21 and 22. The contour data and the compressed character data are set into the shift registers 21 and 22, respectively.

Figure 4:
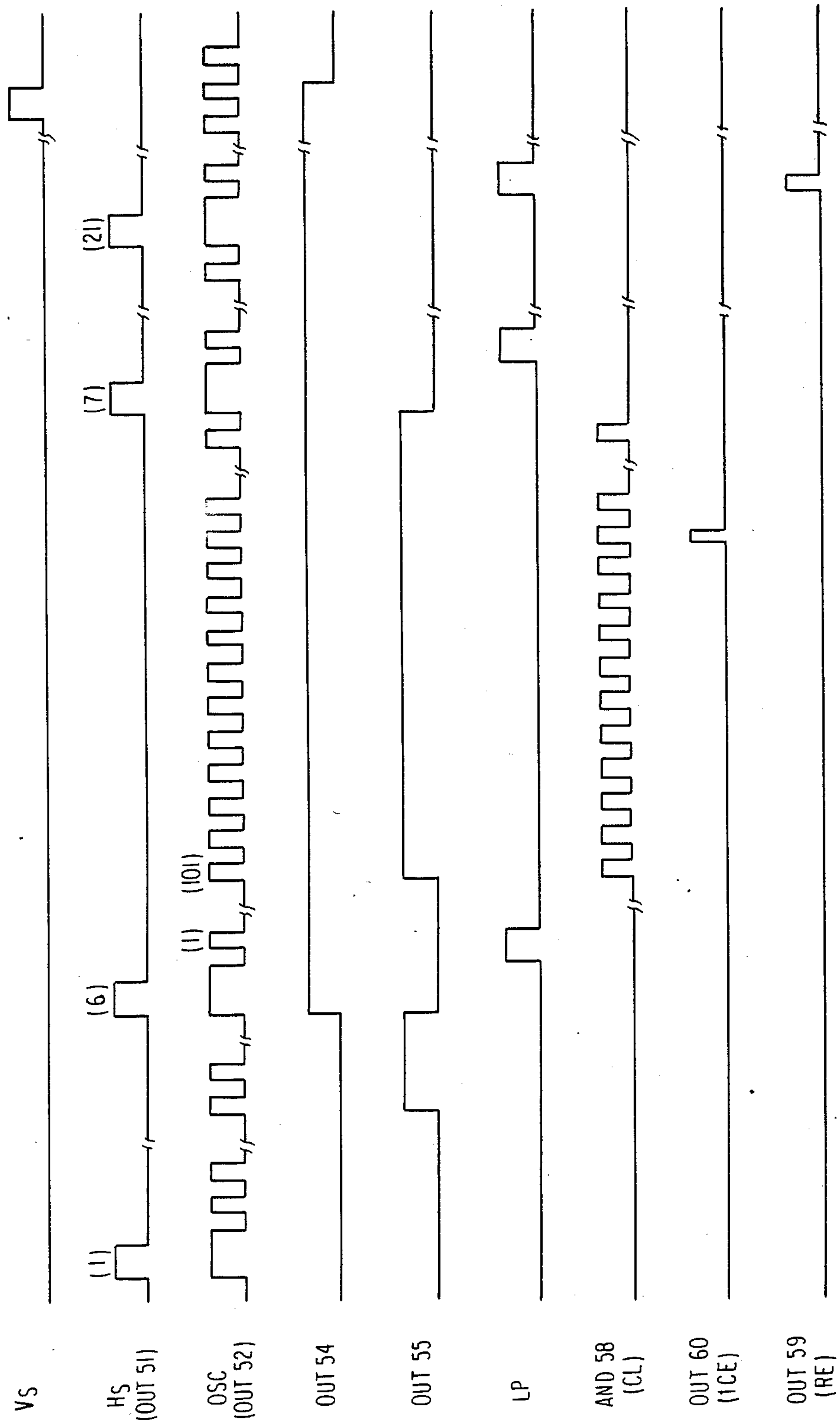
FIG. 4 is a timing chart representing a circuit operation of the clock generator shown in FIG. 3.

The clock generator 19 generates a shift clock CL to superimpose the character data on a video signal. The circuit construction of the clock generator 19 is shown in FIG. 3. Vertical direction character size data, horizontal direction character size data, vertical location data and horizontal location data produced by the processor 10 are stored into a counter 51, a counter 52, a latch circuit 53 and a latch circuit 56, respectively. The character size data are used to determine the vertical and horizontal direction sizes of one character. When the counter 51 is set with, for example, "2", the counter 51 produces one pulse after receiving two horizontal synchronizing pulses Hs. Accordingly, the character size is expanded twice in a vertical direction. In this embodiment, the data stored into the counters 51 and 52 are set to be "1", respectively. Therefore, the outputs of the counters 51 and 52 are the same as the horizontal synchronizing pulse Hs and the clock pulse of an oscillator 50. One clock pulse from the oscillator 50 corresponds to one picture element of the display 7. The oscillator 50 is of a well-known synchronizing type that holds its output at the high level during a high level period of the pulse Hs. Clock pulses are generated after a predetermined time passes from the falling edge of the pulse Hs, as shown in FIG. 4. The outputs of the counters 51 and 52 are supplied respectively to clock terminals $\phi$ of a line counter 54 and a dot counter 55. The counter receives the vertical synchronizing pulse Vs at its inverted preset control terminal $\overline{P}$ and introduces the data of the latch 53 in synchronism with the falling edge of the pulse Vs. The counter 55 receives the horizontal synchronizing pulse Hs at its preset control terminal P and introduces the data of the latch 56 in synchronism with the leading edge of the pulse Hs. The data stored in the latch circuits have starting location information of the character display. Assuming that the character display starting position is 6th horizontal scan line in a vertical direction and is 101th picture elements in a horizontal direction, the counters 54 and 55 are preset with "6" and "101", respectively. As shown in FIG. 4, the counter 54 holds its output at the high level when it receives six horizontal synchronizing pulses Hs, and changes its output to the low level in synchronism with the falling edge of a next vertical synchronizing pulse Vs. The counter 55 holds its output at the high level when supplied with the clock pulses of 101 from the oscillator 50 and changes its output to the low level at the leading edge of a next horizontal synchronizing pulse Hs. The outputs of the counters 51 and 54 are supplied to an AND gate 57, and the outputs of the counter 52, 54 and 54 are supplied to an AND gate 58. Therefore, unless six horizontal synchronizing pulses Hs are supplied after the falling edge of the vertical synchronizing pulse Vs, any of output pulses LP, RE, CL, 1CE is not generated. When six horizontal synchronizing pulses Hs are supplied and the oscillator 50 produces pulses of 101, the gate 51 take an open state. As a result, a shift clock pulses CL are generated as shown in FIG. 4. The shift clock CL is supplied to a one character counter 60. Since the number of bits in a horizontal direction of one character is ten, the counter 60 is preset with "11". Accordingly, the counter 60 generates a one character end pulse CE in synchronism with the eleventh shift clock CL. The gate takes an open state when six horizontal synchronizing pulses Hs are supplied, and produces pulses each time that the horizontal synchronizing pulses Hs are supplied until the vertical synchronizing pulse Vs is applied. These pulses are delayed by a delay circuit 61 to make line pulses LP. The pulses from the gate 57 are also supplied to a one row counter 59. The size in a vertical direction of one character is 16 bits. In other words, the character on one row corresponds to sixteen horizontal scan lines. Therefore, the counter 59 is present with "16", and generates a one row end pulse RE when the gate 57 produces sixteen output pulses, i.e. when twenty-one horizontal synchronizing pulses Hs are supplied. The leading edge of the pulse RE is approximately equal to that of the pulse LP. Thus, the clock generator 19 generates pulses CL, 1CE, LP and CE required for character display.

Figure 5:
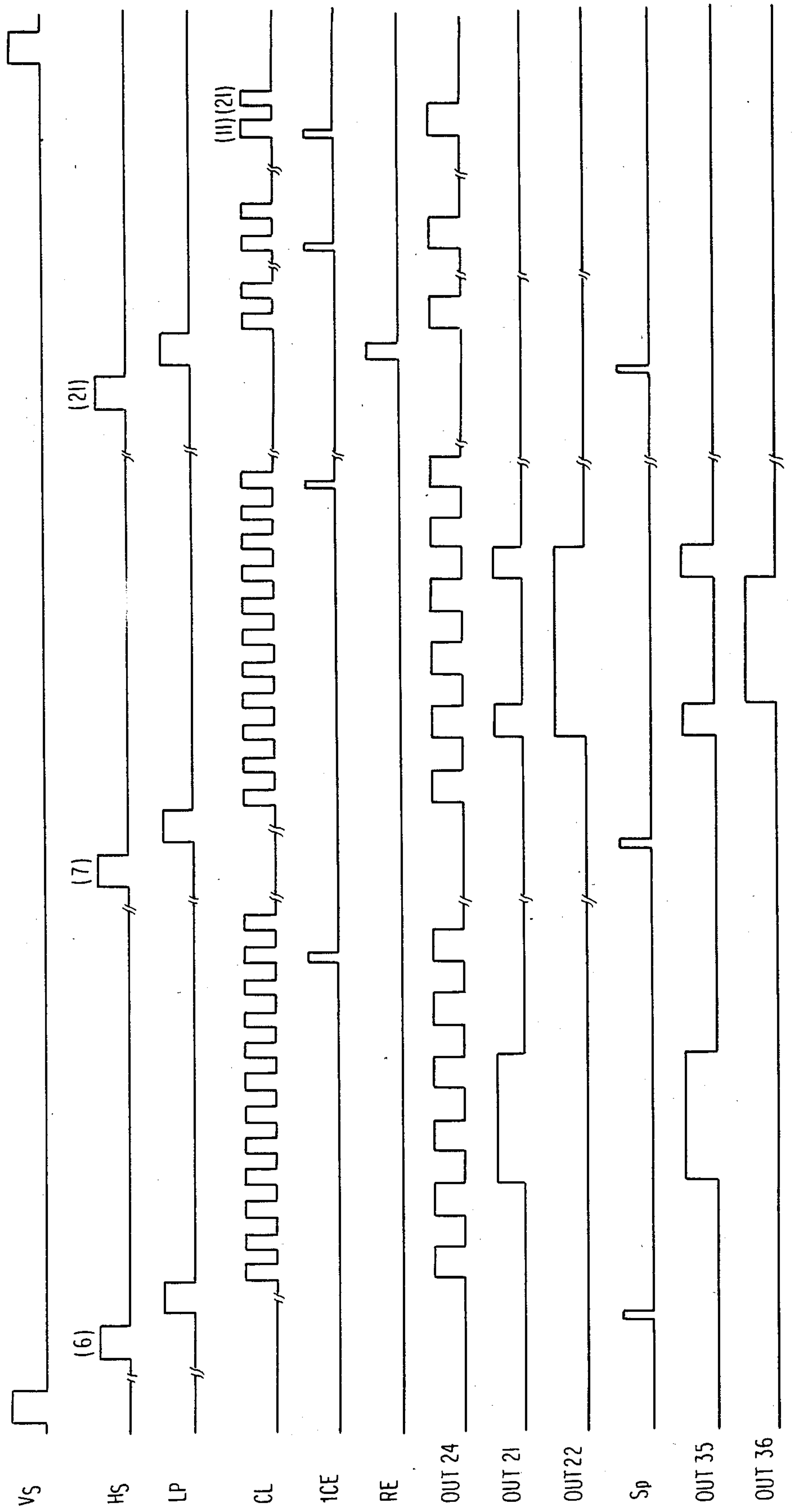
FIG. 5 is a timing chart representing a circuit operation of the circuit shown in FIG. 1.

Turning again back to FIG. 1, since the processor 10 produces the set pulse Sp at the falling edge of the horizontal synchronizing pulse Hs, the data from 0th bit to 9th bit, "0001111000", and the data from 10th bit to 14th bit, "0000", of the read out data from the ROM 11 are stored, respectively, into the shift registers 21 and 22 when the sixth horizontal synchronizing pulse Hs(6) is supplied after the falling edge of the vertical synchronizing pulse Vs. The line pulse LP generated from the clock generator 19 is supplied to the clock terminal $\phi$ of the counter part 20-2 in the ROM pointer 20 to increment the value of the counter part 20-2 by one. The data stored in "1121" address of the ROM 11 is thereby read out. Since the set pulses Sp is not produced, however, the read out data are not introduced into the registers 21 and 22. The shift clock pulses CL from the clock generator 19 are supplied to a clock terminal $\phi$ of the shift register 21 to shift the data stored therein. As a result, the output of the shift register 21 takes a waveform shown in FIG. 5. On the other hand, the shift register 22 receives shift clock pulses via a $\frac{1}{2}$ divider 24. This is because one bit data stored in the register 22 corresponds to two picture elements. Since the data of the register 22 are "0000", its output continues to take the low level, as shown in FIG. 5. As S-R type flip-flop 32 is reset by the horizontal synchronizing pulse Hs, its inverted output $\overline{Q}$ produces a low level signal P1. Therefore, each of AND gates 35 and 36 takes an open state, so that the signals from the registers 21 and 22 are outputted. The output of the AND gate 35 is supplied to the blanking control circuit 5. The circuit 5 changes its outputs to the low level during a high level output period of the AND gate 35 irrespective of the R, G and B signals from the TV circuit 3. The display 7 thereby takes a blanking condition during that period, so that the color "black" is displayed. The output of the AND gate 36 is supplied to the respective first input terminals of AND gates 38 and 40 whose second input terminals are supplied with a high level or a low level from a color data set circuit 37, respectively. Since the AND gate 36 produces the low level output, the outputs of the AND gates 38 to 40 take the low level irrespective of the level from the circuit 37. Accordingly, the adder circuit 6 produces only video picture information or blanking information.

The clock generator 19 generates the one character end pulse 1CE in synchronism with the eleventh shift clock CL. Since the AND gate 29 is in an open state, the pulse 1CE is supplied to a clock terminal $\phi$ of the RAM pointer 18 to increment the content thereof by one. The next address of the RAM 12 is thereby accessed. Since this address stored "FFFF", an all "F" detector 41 detects that data and produces a trigger pulse which is in turn supplied to a set terminal S of the flip-flop 32. A low signal $P_1$ is thus produced from the inverted output $\overline{Q}$ of the flip-flop 32, so that the AND gates 35 and 36 takes a closed state. Although the shift registers 21 and 22 introduce the data read out from the "1121" address of the ROM 11, the outputs of the AND gates 35 and 36 are held at the low level. The trigger signal from the detector 41 is also supplied to a first input terminal of an AND gate 27 whose second input terminal is supplied with the high level from an inverted output $\overline{Q}$ of a a flip-flop 26 taking a reset state. Since the one row end pulse RE is not generated, a stack pointer 25 points to the first stack register S1. Therefore, the data stored in the first register S1 is written as a return address into the RAM pointer 19 in synchronism with the trigger signal. The RAM pointer 18 thus takes its content representing the address of the RAM 12 in which the data "1120" is stored. The trigger signal from the detector 41 disappears before the flip-flop 32 produces the high level at its output Q, so that the AND gate 28 continues to take the closed state. Thus, the character data processing on one horizontal scan line is completed.

As shown in FIG. 5, when the seventh horizontal synchronizing pulse $H_S$ (7) is supplied, the set pulse Sp is generated to set output data from 0th bit to 9th bit (0010000100) and the output data from 10th bit to 14th bit (01110) which are read out from "1121" address of the ROM 11 into the shift registers 21 and 22, respectively. The flip-flop 32 is changed to the reset state, and the flip-flop 26 holds the reset state. The above-mentioned operations occur, so that the shift registers 21 and 22 produce the output signal shown in FIG. 5, respectively. Since the shift register receives a ½ frequency clock from the divider 24 as a shift clock, the high level period of the output of the register 22 corresponds to six cycle periods of the shift clock CL. Thus, the compressed data "01110" is expanded to "0011111100". The output of the shift register 22 is inverted by an inverter 33, and the inverter signal "1100000011" is supplied to a NOR gate together with the output of the shift register 21 "0010000100". Accordingly, the output of the AND gate 36 takes the high level during a period intervening between two high levels in the output of the AND gate 35. In the above-mentioned examples, its output is "0001111000". Thus, the error data contained in expanded character data is corrected. That is, the error data "1" of the location where character overlaps with the contour is converted into "0". In a case where the character data portion is displayed in the color "white", the circuit 37 supplies the high level to each of the AND gates 38 to 40. In the case of displaying it in green color, only the gate 39 is supplied with the high level from the circuit 37. Thus, the output levels of the circuit 37 are controlled in accordance with desired color. Assuming that the high level is supplied from the circuit 37 only to the AND gate 39, the high level from the AND gate 36 is supplied to the adder circuit 6 only via the gate 39. The adder circuit 6 thereby supplies only a G signal to the display 7. Therefore the inside portion of the contour of the character is displayed in green color.

In response to the falling edge of the 21st horizontal synchronizing pulse Hs(21), the data of "112F" address of the ROM 11 are set into the shift register 21 and 22, and the data shift operation is carried out. The clock generator 19 generates the one row end pulse RE. This pulse RE is supplied to a reset terminal R of the ROM pointer 20 to reset it. The pulse RE is also supplied to a set terminal S of the flip-flop 26, so that an inverted output $\overline{Q}$ thereof takes the low level. The gate 27 thereby takes the closed state, and the gate 42 takes the open state. In response to the one character end pulse CE which is generated after the end of data shift operation, the content of the RAM pointer 18 is incremented by one to access the next address of the RAM 11. Since that address stores the data of "FFFF", the detector 41 produces the trigger signal to set the flip-flop 32. Since the gate 27 is in the closed state, the trigger signal is not supplied to the stack pointer 25. When eleven shift clocks are further generated as shown in FIG. 5, the pulse CE is supplied via the gate 42 to the RAM pointer 18. A further next address of the RAM 12 is thereby accessed. Since that address stores the data of "FFFF", the detector 41 produces again the trigger pulse. This pulse is supplied via the gate 28 to a reset terminal R of the RAM pointer 18 and further to the processor 10 as a character display end pulse CEND. The RAM pointer 18 is thereby reset. As a result, the character display on one video picture is completed. When the vertical synchronizing pulse Vs is thereafter supplied, the data write operation is carried out during the high level period of the pulse Vs and the above-mentioned operation is performed.

Figure 6:
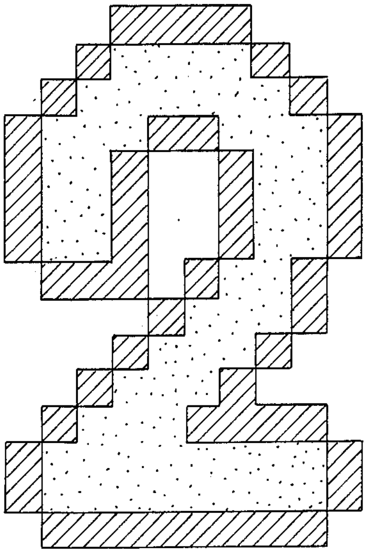
FIG. 6 is a pattern diagram showing a displayed character.

Thus, the character having an emphasizing contour is displayed in the display 7, as shown in FIG. 6. In this figure, the portions denoted in hatching represent the blanking state of the display 7 as the contour portion, and are thus displayed in black. The inside portion of the contour portion, that is, the character portion (dotted area) is displayed in green color, and the video picture is displayed on the outside of the contour.

In FIG. 1, the second stack register S2 is stored with a return address of a second row character. In a case of the display of more than two rows, more than two stack registers are provided, and return addresses of the respective rows are stored in the associated stack register. The operation of character display of two rows will be described below.

Figure 7:
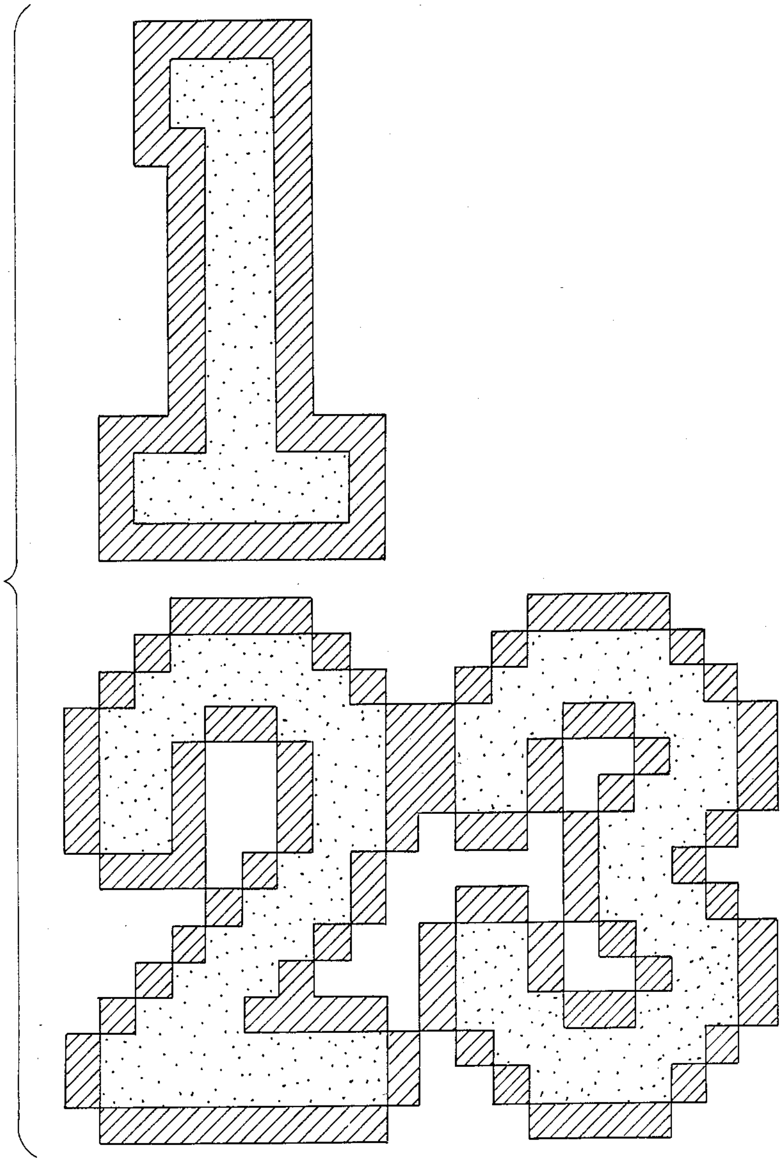
FIG. 7 is another diagram showing displayed characters.

Assuming that a numeral "1" is displayed on the first row and a numeral "23" is displayed on the second row, the addresses from "F000" to "F005" in the RAM 12 are stored respectively with "1110", "FFFF", "1120", "1130", "FFFF", and "FFFF", and the first and second stack registers $S_1$ and $S_2$ are stored respectively with "F000" and "F002". At the end of the character display on the first row, the RAM pointer 18 is not reset, but its content is incremented by one. The "F002" address of the RAM 12 is thereby accessed, so that the ROM 11 is supplied with the data of "1120" from the ROM pointer 20. When the display of the character "2" on the second row is completed, the data of "1130" appears on the output of the ROM pointer 20. Since the stack pointer 25 points the second stack register $S_2$ in response to the pulse RE which is generated at the end of character display of the first row, the RAM pointer 18 is stored with the data of "F002" as a return address when the display one horizontal scan line in the second row is completed. As a result, the characters shown in FIG. 7 are displayed on the display 7.

Figure 8:
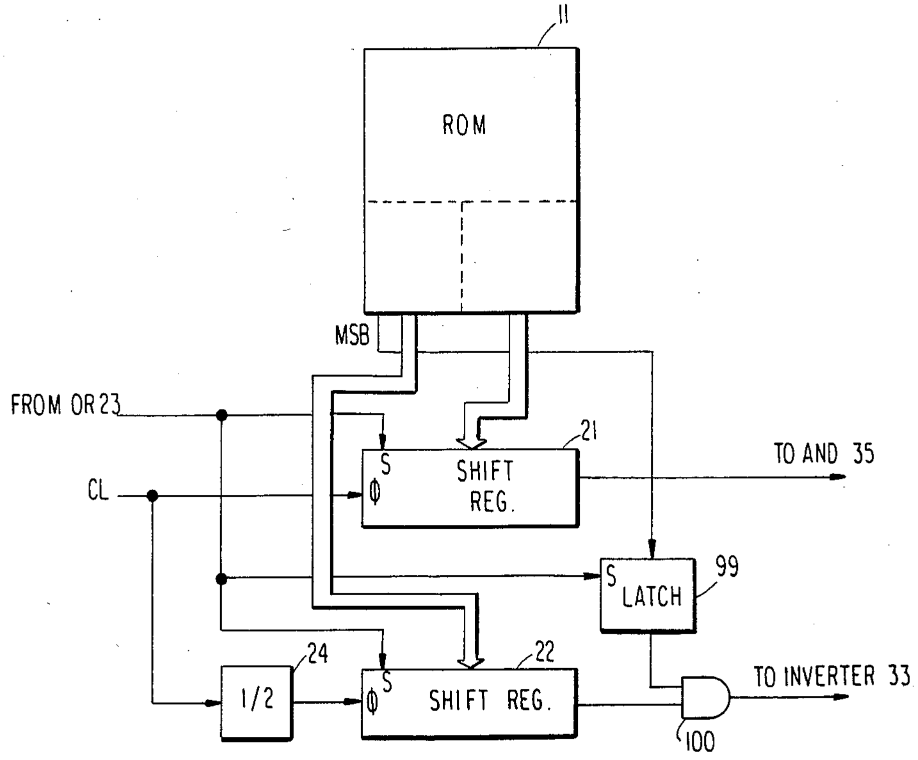
FIG. 8 is a circuit diagram representing a part of another embodiment of the present invention.

FIG. 8 shows a part of another embodiment of the present invention, in which the same constituents as those shown in FIG. 1 are denoted the same reference numerals to omit the further explanation thereof. In this embodiment, the 15th bit (MSB) of the ROM 11 is also utilized to control the character display. More particularly, the 15th bit (MSB) of the ROM 11 is stored into a latch circuit 99 in response to the set pulse to the shift registers 21 and 22. The output of the latch 99 is supplied to a first input terminal of an AND gate 100 whose second input terminal is supplied with the output of the shift register 22. When the MSB of the ROM 11 is written with "1", the gate takes an open state. In this case, the circuit operation is the same as that of the circuit shown in FIG. 1. On the other hand, when the MSB of the ROM 11 stores "0", the gate is closed. Accordingly, the outputs of the AND gates 38 to 40 (FIG. 1) take the low level irrespective of the outputs of the shift register 22. In this case, the portions denoted in hatching in FIGS. 6 and 7 are displayed in black color, whereas all of the remaining portions display a video picture. The gate 100 may be provided on the side of the output of the inverter 33, NOR gate 34, and AND gate 36.

Characters other than a numeral can be displayed, and one character can be displayed over a plurality of rows.

The present invention is not limited to the above embodiments, but may be modified and changed without departing from the scope and spirit of the invention. For example, the contour data can be compressed in place of the compression of the character data.

What is claimed is:

1. A character generator comprising a memory storing data for a character to be displayed, said data including first data representing a contour of said character and second data representing said character, means for reading out said data from said memory, a first shift register temporarily storing the outputted first data, a second shift register temporarily storing the outputted second data, means for supplying a first shift clock signal to said first shift register, said first shift clock signal having a first frequency, means for supplying a second shift clock signal to said second shift register, said second shift clock signal having a second frequency, that is different from said first frequency, means responsive to the output of said first shift register for producing a contour signal of said character, and means responsive to outputs of said first and second shift registers for producing a character signal.

2. The generator as claimed in claim 1, wherein said first data is constructed with a first number of bits and said second data is constructed with a second number of bits, said first number being different from said second number.

3. The character generator of claim 2 wherein the character signal is superposed on a video signal, said generator further comprising means for storing vertical direction character size data and horizontal direction character size data, and means responsive to said vertical and horizontal size data for adjusting the size of the displayed character.

4. The character generator of claim 2 wherein said memory further storing third data for controlling the production of said character signal, said generator further comprising gating means connected to receive said third data stored in said memory and the output of said second shift register in order to selectively control said character signal.

5. A character generator for displaying characters on the display of a received broadcast video signal comprising:

a source of data for at least one character that is to be displayed, said data including first data representing a contour of said character and second data representing said character, means for storing said first and second data for each character in a repective addressable memory location, means for addressing said memory location and for reading said first and second data from said storing means, means for temporarily storing said first data and said second data read from said memory location, means for separately reading from said temporary storage means said first data and said second data, said first data being read at a rate that is different from said second frequency, and means responsive to the outputs of said temporary storage means for prodicing a contoured character.

6. The character generator of claim 5, including means for applying said first data read from said temporary storage means to control the blanking of the display.

7. The character generator of claim including means responsive to said first data read from said temporary storage means and said second data read from said temporary storage means to control color signals of the display.

* * * * *